United States Patent [19]
Self et al.

[11] Patent Number: 6,112,308
[45] Date of Patent: Aug. 29, 2000

[54] CASCADED MULTIPLE INTERNAL PHASE-LOCKED LOOPS FOR SYNCHRONIZATION OF HIERARCHICALLY DISTINCT CHIPSET COMPONENTS AND SUBSYSTEMS

[75] Inventors: Keith M. Self; Jeffrey E. Smith, both of Aloha, Oreg.

[73] Assignee: Intel Corporation, Santa Clara, Calif.

[21] Appl. No.: 09/126,937

[22] Filed: Jul. 30, 1998

Related U.S. Application Data

[63] Continuation-in-part of application No. 09/012,479, Jan. 23, 1998, Pat. No. 6,047,383.

[51] Int. Cl.[7] .................................................... G06F 1/12
[52] U.S. Cl. ...................................... 713/400; 395/500.13
[58] Field of Search ................................. 713/400, 500; 395/500.09, 500.1, 500.12, 500.13, 500.16

[56] References Cited

U.S. PATENT DOCUMENTS

| | | | |
|---|---|---|---|
| 3,567,914 | 3/1971 | Neese et al. | 395/500.16 |
| 5,544,088 | 8/1996 | Aubertine et al. | 395/500.14 |

*Primary Examiner*—Thomas M. Heckler
*Attorney, Agent, or Firm*—Blakely, Sokoloff, Taylor & Zafman LLP

[57] ABSTRACT

Methods and apparatus for easing design constraints with respect to placement of computer system components and subsystems requiring relative synchronicity is described. In one embodiment the apparatus includes a first and a second integrated circuit wherein each integrated circuit includes a first phase-locked loop (PLL) formed on an integrated circuit die. A reference clock signal pin is coupled to the first PLL by a path of electrical length L1 for propagating a reference clock signal to the first PLL. A first PLL driver is coupled to the first PLL. A first PLL feedback pin is coupled to the first PLL by a path of electrical length L2, wherein L1≈L2. The first and second integrated circuits are cascade-coupled by coupling the first PLL driver of the first integrated circuit to the reference clock signal pin of the second integrated circuit using a propagation path of electrical length L3. In one embodiment a feedback path of electrical length L4 couples the first PLL driver and feedback pin of the first integrated circuit such that L3≈L4. In one embodiment L1, L2, L3, and L4 have corresponding physical lengths D1, D2, D3, and D4, wherein D1≈D2 and D3≈D4. The cascaded integrated circuits enable providing synchronicity between components of a same tier as well as between multiple tiers of a hierarchical computer system architecture.

14 Claims, 7 Drawing Sheets

CASCADED MULTIPLE INTERNAL PHASE-LOCKED LOOPS FOR SYNCHRONIZATION OF HIERARCHICALLY DISTINCT CHIPSET COMPONENTS AND SUBSYSTEMS

CROSS-REFERENCE TO RELATED APPLICATIONS

This application is a continuation-in-part of application Ser. No. 09/012,479 filed on Jan. 23, 1998 now U.S. Pat. No. 6,047,383.

FIELD OF THE INVENTION

This invention is drawn to synchronization of signals within a computer system having multiple chipset components and subsystems.

BACKGROUND OF THE INVENTION

Changes in input/output (I/O) timing can severely impact I/O performance, particularly with respect to high performance or high frequency I/O design. Some high speed computers rely on synchronous interfaces between various integrated circuits and subsystems that make up the computer. In order to ensure synchronicity a common clock signal is typically propagated to each of the synchronous components of the computer system.

Any skew introduced into the clock signal during propagation can have a significant impact on performance. Although shifting integer multiples of a clock cycle may be permissible (so that the clock edges are aligned), any other amount of shifting of the clock signal can create uncertainty as to validity. For example, data defined to be valid during a particular portion of a master clock cycle may not be valid at the same portion of a propagated clock signal if the propagated clock signal is skewed with respect to the master clock signal or another propagated clock signal. The performance impact can range from introducing undesirable input/output wait delays to rendering the computer system inoperable.

Typically the clock signal is propagated to multiple components using circuit board traces. The amount of skew in the propagated signal is proportional to the electrical length of the trace. Consider the propagation of a clock signal to two integrated circuits. One method of ensuring propagation of a clock signal so that the two integrated circuits are operating synchronously to each other is to ensure that the electrical length of the traces to each integrated circuit from a common clock signal are identical.

Ensuring accurate clock signal propagation can create difficulty in designing the physical layout of a computer system having multiple integrated circuits and subsystems. As the number of integrated circuits and subsystems increases, the design process becomes significantly more complicated.

Another disadvantage of this technique is that it is not particularly applicable to scaleable systems. Consider a system having hierarchies of synchronous subsystems. In order to ensure relative synchronicity, each subsystem should be designed so that the electrical lengths of the traces between the common clock signal and each component within the subsystem is the same. Moreover, each of the subsystems would need to be designed so that the electrical length from the common clock signal to a component in one subsystem is the same as the electrical length from the common clock signal to a component in another subsystem. The process becomes even more complicated with multiple hierarchies of subsystems or components.

SUMMARY OF THE INVENTION

In view of limitations of known systems and methods, an apparatus and method for easing design constraints with respect to placement of computer system components and subsystems requiring relative synchronicity at the same or different frequencies is described.

In one embodiment the apparatus includes a first and a second integrated circuit having a first phase-locked loop (PLL) formed on an integrated circuit die. A reference clock signal pin is coupled to the first PLL by a path of electrical length L1 for propagating a reference clock signal to the first PLL. A first PLL driver is coupled to the first PLL. A first PLL feedback pin is coupled to the first PLL by a path of electrical length L2, wherein L1≈L2. The first and second integrated circuits are cascade-coupled by coupling the first PLL driver of the first integrated circuit to the reference clock signal pin of the second integrated circuit using a propagation path of electrical length L3.

In one embodiment, a feedback path of electrical length L4 couples the first PLL driver and feedback pin of the first integrated circuit such that L3≈L4. In one embodiment, L1, L2, L3, and L4 have corresponding physical lengths D1, D2, D3, and D4, wherein D1≈D2 and D3≈D4.

The cascaded integrated circuits enable providing synchronicity between components of a same tier as well as between multiple tiers of a hierarchical computer system architecture.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
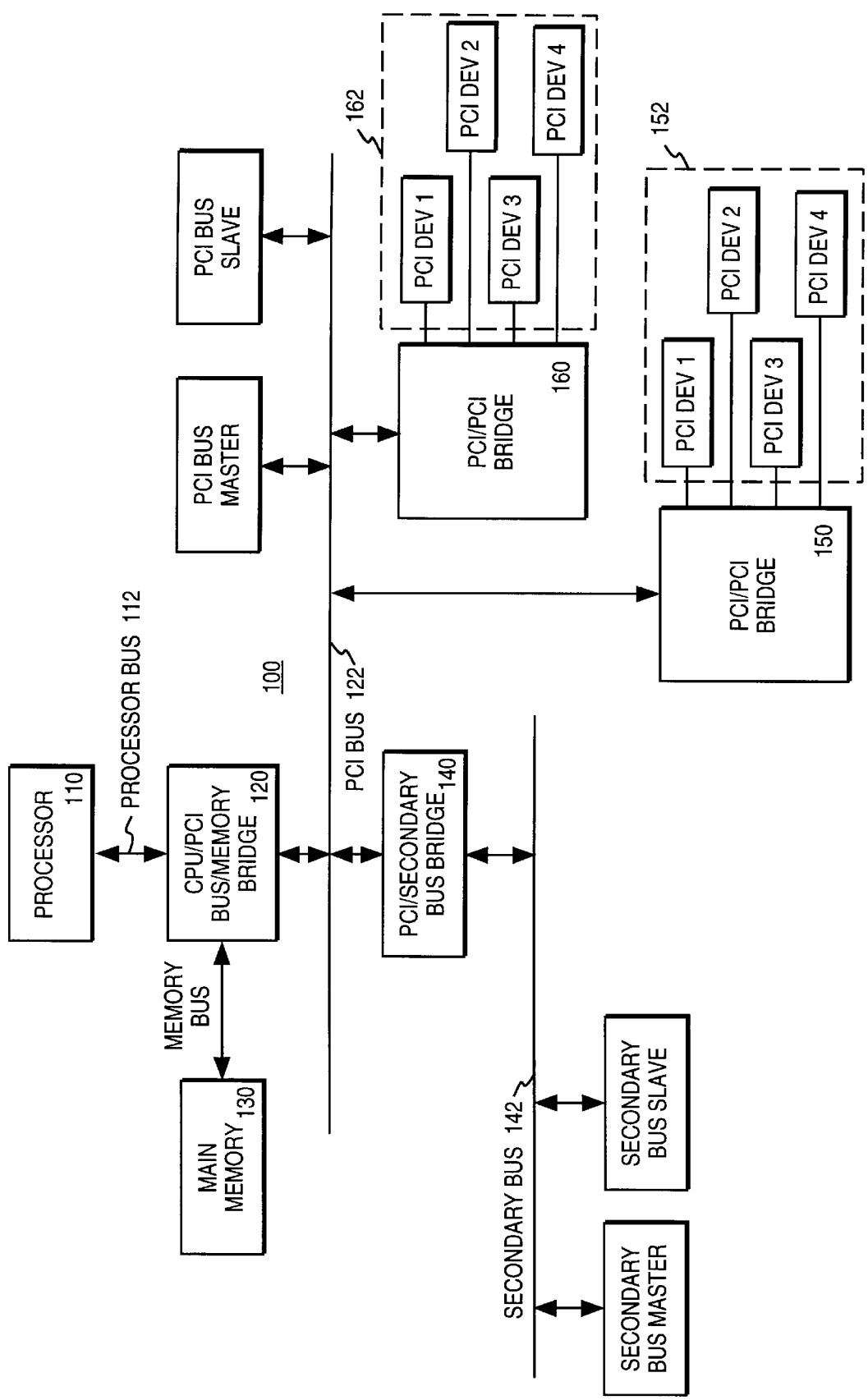
FIG. 1 illustrates one embodiment of a computer system.

FIG. 1 illustrates one embodiment of a computer system architecture 100. Processor 110 communicates with memory 130 using a high speed processor bus 112 through bridge 120. Bridge 120 permits communication between bus 122 and processor bus 112. In one embodiment, bus 122 is a Peripheral Component Interconnect (PCI) bus 122. PCI compatible devices coupled to PCI bus 122 can communicate with processor 110 through the processor bus/PCI bus bridge 120.

The computer system of FIG. 1 has multiple bus types. Another bridge is used to communicate between the PCI bus 122 and a secondary bus 142. PCI/Secondary bus bridge 140 provides a path for devices compatible with the secondary bus to communicate with the processor through the PCI bus 122. In one embodiment, the secondary bus 142 is an Industry Standard Architecture (ISA) bus.

Processor bus/PCI bus bridge 120 may be referred to as the North Bridge. PCI/Secondary bus bridge 140 may be referred to as the South Bridge. Any communication between a PCI compatible device and the processor 110 passes through the North Bridge. Any communication between the processor 110 and a secondary bus compatible device passes through both the South Bridge 140 and the North Bridge 120.

PCI/PCI bridges 150 and 160 extend PCI bus 122 to support additional PCI compatible devices 152 and 162. In one embodiment, a single PCI/PCI bridge residing on a single integrated circuit is used. In the embodiment illustrated, the functionality is divided into more than one integrated circuit.

PCI bus compatible devices must adhere to strict timing standards. (see, e.g., PCI Local Bus Specification, rev. 2.1 (PCI SIG, June 1995)). Given the higher performance levels of the PCI bus, excessive clock skew can have disastrous effects. For synchronous operation, data is considered valid during a particular portion of a clock cycle. If a clock signal propagated to an individual component is shifted so that it is no longer in synchronization (i.e., clock edges aligned) with a reference clock signal, the definitions of validity no longer hold true with respect to the propagated clock signal.

Figure 2:
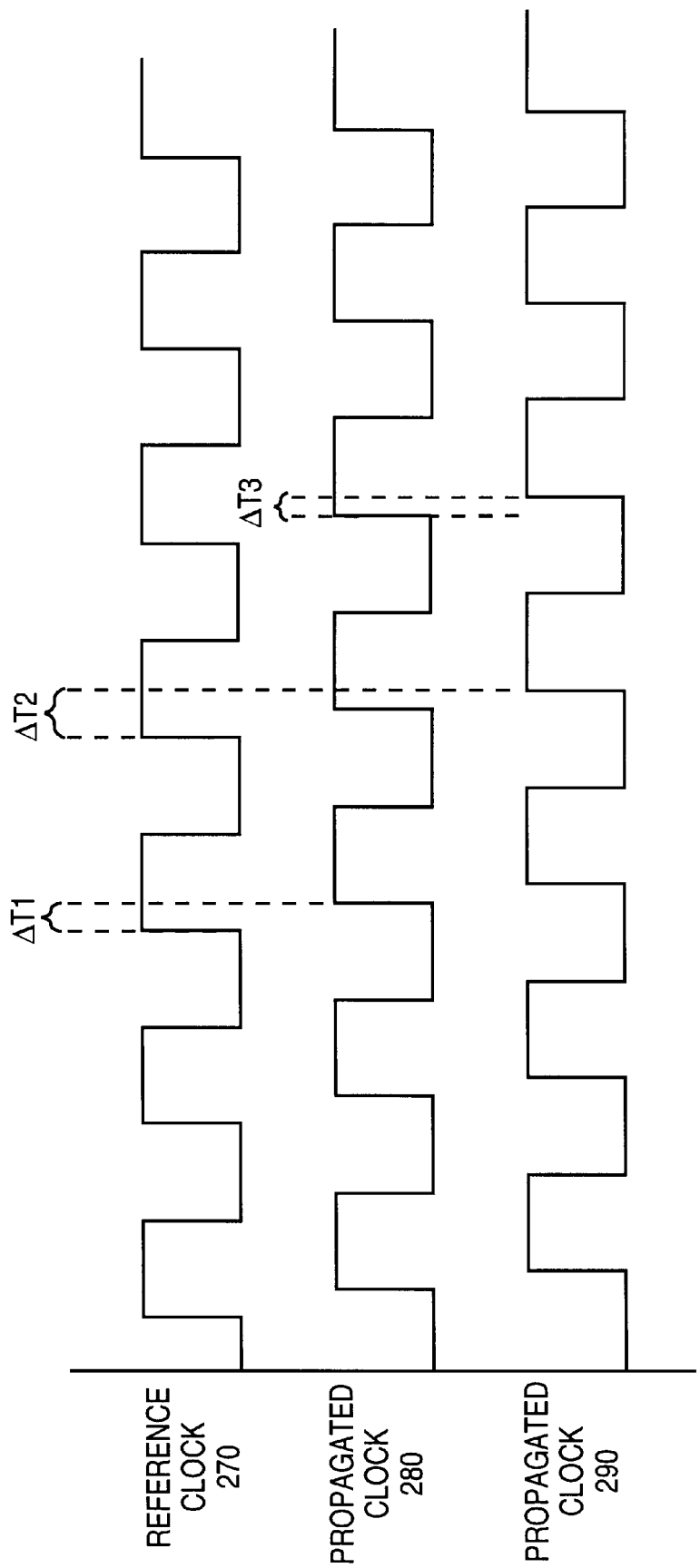
FIG. 2 illustrates propagated clock signals skewed with respect to a reference clock signal.

FIG. 2 illustrates a reference clock 270 and propagated clock signals 280 and 290. Typically data is assumed to be valid within a predetermined time period about the edge of the reference clock signal. Skewing of the propagated clock signal so that it is no longer in synchronization with the reference clock signal can result in interpreting indeterminate data as valid. Although a skew of an integer number of reference clock cycles may be permissible, any skew that would destroy synchronization between a propagated clock signal and the reference clock signal might not be.

For example, the rising edge of propagated clock signal 280 is shifted by $\Delta T1$ with respect to the rising edge of reference clock signal 270. The rising edge of propagated clock signal 290 is shifted by $\Delta T2$ with respect to the rising edge of reference clock signal 270. Finally, the two propagated clock signals 280 and 290 are out of synchronization by $\Delta T3$ with respect to each other. If the window of data validity is not large enough to accommodate all three skews, the computer system can be rendered inoperable because of the inability to synchronously communicate data.

One method of solving the clock skew problem is to select the electrical lengths of propagation traces between the reference clock and synchronized devices such that the propagated clocks are in synchronization. In one embodiment, this requires the propagation traces to have the same length. In an alternative embodiment, different lengths of propagation traces are permitted as long as the propagated signals are still synchronized with respect to each other (i.e., integer number of clock cycles delay is permissible as long as clock signals are in synchronization with each other). Such constraints can create a significant burden during the design and layout process.

Figure 3:
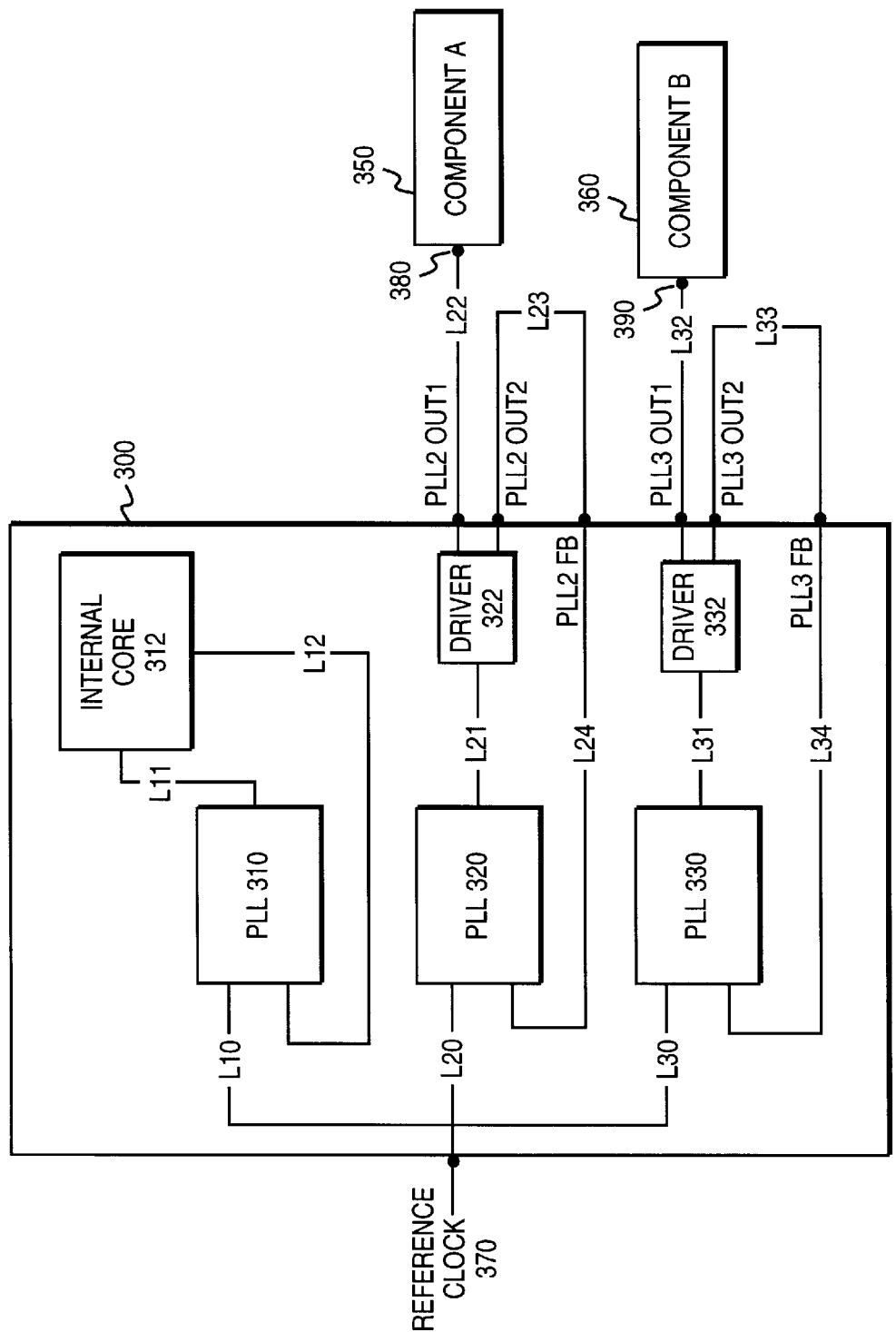
FIG. 3 illustrates an integrated circuit including a plurality of phase-locked loops for maintaining synchronicity of propagated clock signals.

FIG. 3 illustrates an apparatus for maintaining synchronicity between multiple components of a computer architecture chipset. Integrated circuit 300 includes a plurality of phase-locked loops (PLLs). A reference clock signal 370 is provided as one input to the plurality of PLLs. The PLL outputs serve as the clock signal to be propagated to an associated component.

In the illustrated embodiment, PLL 310 provides a propagated clock signal to internal core logic 312. PLL 320 provides a clock signal to one associated component 350. PLL 330 provides a clock signal to another associated component 360. In order to ensure high performance operation components 350 and 360 should operate in synchronization with internal core 312. This requires synchronization of clock signals at the internal core, component A, and component B.

In order to ensure synchronization between the various components, PLLs 310, 320, and 330 maintain synchronization between their respective propagated clock signals and the reference clock signal 370 independently of the relative electrical lengths of their propagation traces as described below.

The electrical lengths and physical lengths of various propagation paths are defined in Table 1.

TABLE 1

| ELECTRICAL LENGTH | PHYSICAL LENGTH | FROM | TO |
| --- | --- | --- | --- |
| L10 | D10 | REFERENCE CLOCK PIN | PPL 310 |
| L11 | D11 | PLL 310 | INTERNAL CORE 312 |
| L12 | D12 | INTERNAL CORE 312 | PLL 310 FEEDBACK |
| L20 | D20 | REFERENCE CLOCK PIN | PLL 320 |
| L21 | D21 | PLL 320 | DRIVER 322 |
| L22 | D22 | DRIVER 322 | COMPONENT A |
| L23 | D23 | DRIVER 322 | PLL 320 FEEDBACK PIN |
| L24 | D24 | PLL 320 FEEDBACK PIN | PLL 320 |
| L30 | D30 | REFERENCE CLOCK PIN | PLL 330 |
| L31 | D31 | PPL 330 | DRIVER 332 |
| L32 | D32 | DRIVER 332 | COMPONENT B |
| L33 | D33 | DRIVER 332 | PLL 330 FEEDBACK PIN |
| L34 | D34 | PLL 330 FEEDBACK PIN | PLL 330 |

Typically a PLL generates an output signal indicative of the phase relationship between two input signals. By using the output signal as one of the input signals a feedback loop is established. The use of the output signal in a feedback loop will cause the PLL to stabilize its output so that the two input signals are synchronized with respect to each other. Thus if the other input signal is a reference clock signal, the PLL will stabilize or "lock-in" so that the feedback signal at one PLL input is synchronized with the reference clock signal at the other PLL input.

Typically the output signal is propagated to other components. The propagated clock signal will accumulate propagation delays, however, so that the signal appearing at the immediate output of the PLL is not synchronous with respect to the propagated clock signal. For short propagation distances, the propagation delay may be negligible. As the frequency of the reference clock signal increases, however, the propagation delay becomes more significant with respect to the period of the reference clock signal. Thus for longer propagation distances or higher frequencies (or both) the effect of the accumulated propagation delay may be unacceptable.

Generally, as long as the difference between the feedback path propagation delay and the original propagation path delay is an integer multiple of reference clock signal periods, T, the propagated clock signal will be synchronized with the reference clock signal.

The term "equal" and the expression "=" should be interpreted in light of manufacturing capability as well as tolerances that the system can accommodate. For example, some skew may be permissible under the system design specifications. Thus in the following discussion "=" should be interpreted as substantially equal (i.e., "≈") from an integrated circuit design or manufacturing capability so as to result in equality within the acceptable tolerance ranges.

In order to ensure that the propagated clock signal is synchronized with reference clock 370, the electrical length from the reference clock pin to a given component should equal the electrical length of the feedback path plus an integer number of reference clock cycle periods.

Integrated circuit 300 is designed so that the electrical lengths from an output driver to its associated output pins are the same and thus contribute no net propagation delays between the feedback and the propagation paths.

The electrical length of the path from the output of a PLL to its associated driver or internal core (i.e., L11, L21, or L31) is not relevant with respect to maintaining synchronicity. Moreover, the electrical lengths of the path from each PLL to its associated driver (or internal core) need not be the same.

In one embodiment, integrated circuit 300 is designed so that the electrical length of the path from each PLL to its associated driver are the same (i.e., L11=L21=L31). In an alternative embodiment, the electrical lengths of the path from each PLL to its associated driver are not all the same.

Referring to PLL 320, the propagated clock signal at 380 and reference clock signal 370 will be synchronized as long as |(L20+L22)−(L23+L24)|=nT, where n is any integer ≧0. Similarly, the internal core and reference clock signal 370 will be synchronized as long as |L10−L12|=mT, wherein m is any integer ≧0.

Design of the integrated circuit is typically performed at a different level than the design of the system. Thus with respect to PLL 320, for example, lengths L22 and L23 are under the control of a system integrator while lengths L20 and L24 are controlled by the integrated circuit manufacturer. Typically, detailed system level design is performed substantially independently of detailed component design. Thus the integrated circuit designer needs to be able to design the integrated circuit without knowledge of the actual values of L22 and L23. Similarly, the system designer needs to be able to design the computer system without regard to the actual values of L20 and L24.

In one embodiment, the integrated circuit is designed so that L20=L24. The system designer thus need only ensure that |L22−L23|=nT. This integrated circuit design offers a number of advantages. In particular, the system designer can use the same integrated circuit for a variety of reference clock frequencies without regard to the actual values of L20 and L24. As long as L20=L24, the integrated circuit does not introduce a frequency dependent difference in propagation delays between the original propagation path and the feedback path.

In one embodiment, L22 and L23 are selected such that |L22−L23|=nT, wherein n<>0. In an alternative embodiment, L22 and L23 are selected so that L22=L23 (i.e., n=0). This alternative embodiment offers the advantage of using the same system design for a variety of frequencies. In particular, the frequency of the reference clock signal is irrelevant as long as L22=L23, regardless of the actual values of L22 and L23.

With respect to PLL 330, the same requirements hold. In one embodiment, (i.e., n=0) the electrical lengths set forth in Table 1 are selected so that L30+L32=L33+L34 in order to ensure that the propagated clock signal at component B is in synchronization with the reference clock signal 370. The integrated circuit 300 is designed so that L30=L34. Thus the system designer need only be concerned with ensuring L32=L33, regardless of the actual lengths of L32 and L33.

With respect to PLL 310, the integrated circuit is designed so that L10=L12 in one embodiment. This ensures that the propagated clock signal presented to the internal core 312 is synchronized with the reference clock signal 370.

Some skew is introduced by the paths from the reference clock signal pin to the PLLs. Thus the reference clock signal propagated to the PLLs may be somewhat skewed from each other if electrical lengths L10, L20, and L30 are not the same.

In order to ensure relative synchronicity between PLLs 310, 320, and 330, the difference in electrical lengths between the reference clock signal pin and the individual PLLs should be an integer multiple of the period of the reference clock signal. Thus L10, L20, and L30 should be selected such that |L10−L20|=iT, |L10−L30|=jT, and |L20−L30|=kT, wherein i, j, and k are integers ≧0.

In one embodiment, L10, L20, and L30 are the same. Thus L10=L20=L30 (i.e., i, j, and k=0). This integrated circuit design permit usage for a variety of frequencies because the difference in propagation delays between the paths is no longer a function of the reference clock signal frequency.

The design presented above enables the propagated clock signal at component A 350, component B 360, and internal core 312 to be in synchronization with the reference clock signal 370 (and therefore each other) independent of whether the electrical lengths of the paths from integrated circuit 300 to component A (i.e., L22) and to component B (i.e., L32) are the same.

Typically the electrical length L of a path can be expressed as a function of the physical length D of the path. Thus L20=$f_1$(D20), L22=$f_2$(D22), L23=$f_3$(D23), L24=$f_4$(D24).

Given that the paths identified by L20 and L24 are located within the same integrated circuit, in one embodiment the electrical characteristics of the paths are substantially the same such that $f_1(x)=f_4(x)$. This equivalence is not required and in another embodiment $f_1(x) \neq f_4(x)$.

Given that the paths identified by L22 and L23 are located outside the integrated circuit, in one embodiment the electrical characteristics of the paths are substantially the same such that $f_2(x)=f_3(x)$. This equivalence is not required, however. In one embodiment $f_2(x) \neq f_3(x)$. This may be the case, for example, because of the use of different layers of propagation traces in a multi-layer printed circuit board.

In one embodiment, the electrical characteristics of the propagation trace and the feedback trace are substantially the same. Thus in one embodiment, the computer system is designed so that the physical length of the path from output driver 322 to component A is the same as the physical length of the feedback path from output driver 322 to the PLL 320 feedback pin. Similarly, the physical length of the path from output driver 332 to component B is selected to be the same as the physical length of the feedback path from output driver 332 to the PLL 330 feedback pin.

Assuming $f_1(x)=f_4(x)$ and $f_2(x)=f_3(x)$, the requirement to obtain synchronicity becomes $f_1$(D20)+$f_2$(D22)=$f_2$(D23)+$f_1$(D24). Designing the integrated circuit such that D20=D24 implies that the system designer need only ensure D22=D23 in one embodiment so that propagated clock signal 380 is synchronized with reference clock signal 370. Thus in one embodiment, the integrated circuit is designed so that the physical length D20=D24. In one embodiment of the integrated circuit D20=D24, D30=D34, and D10=D12.

If L10, L20, and L30 are selected so that that L10=L20= L30, this implies D10=D20=D30. Thus in one embodiment the integrated circuit is fabricated such that D10, D12, D20, D24, D30, and D34 are substantially the same.

For some computer architectures, the derivation of other needed clock signals is a function of the reference clock signal. For example, a PCI bus is typically based on a nominal frequency of approximately 33 MHz. Several processors are designed to operate at some multiple of 33 MHz, so that the processor clock can be divided to generate the 33 MHz clock signal. For example, a clock signal for a 266 MHz processor can be divided by 7 to generate the 33 MHz clock. A 200 MHz processor clock signal would be divided by 6.

In one embodiment, the integrated circuit 300 of FIG. 3 includes a programmable divider\counter to permit accommodating more than one processor clock speed.

Placing the programmable divider in the circuit before the PLL may result in an undesirable propagation delay across the programmable divider so that adequate relative synchronicity between the three PLLs cannot be achieved.

Figure 4:
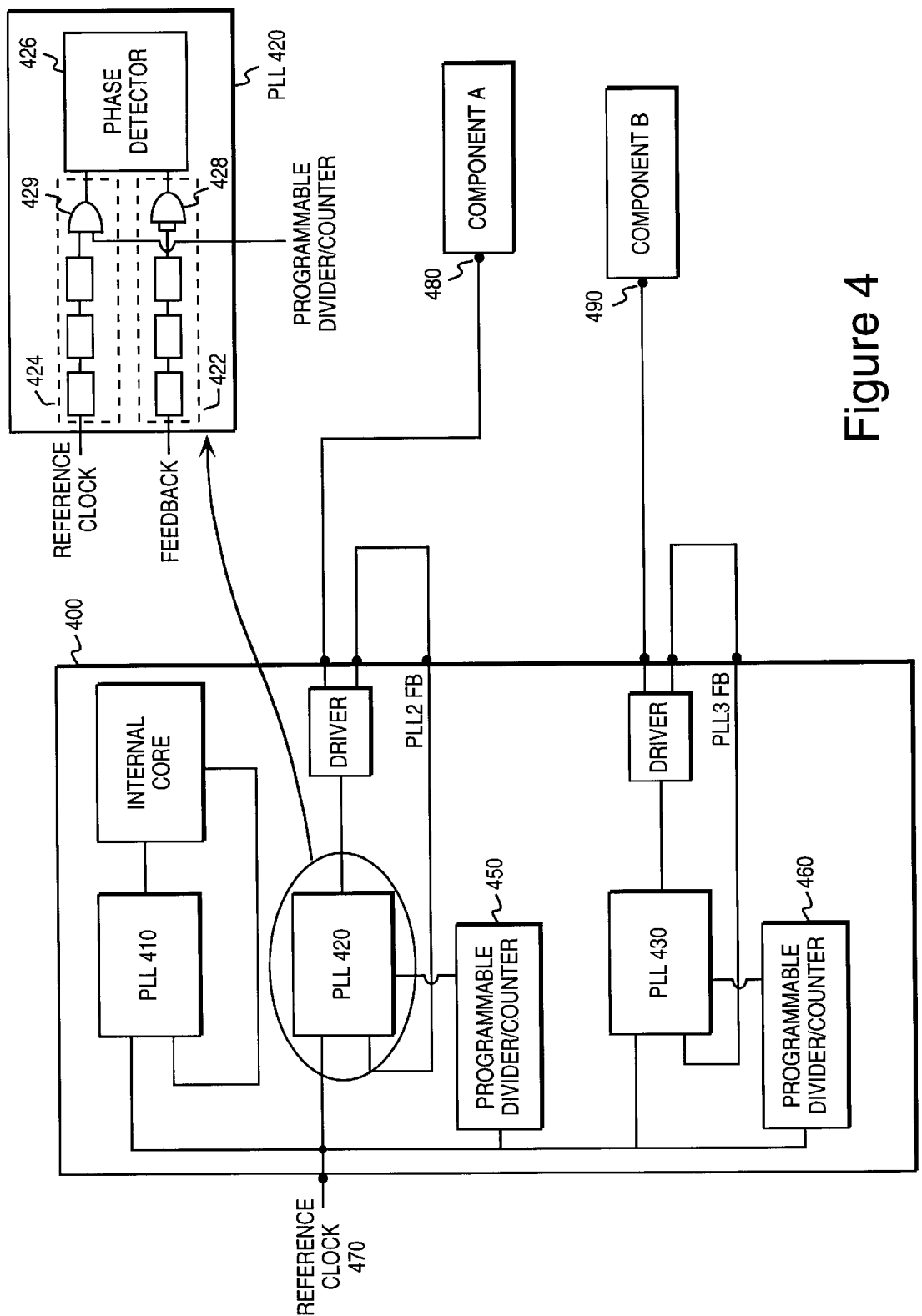
FIG. 4 illustrates an integrated circuit including a plurality of phase-locked loops with associated programmable divider/counters.

FIG. 4 illustrates one embodiment of the integrated circuit of FIG. 3 including programmable dividers. Integrated circuit 400 includes PLL 410, 420, and 430. Programmable dividers 450 and 460 are associated with PLLs 420 and 430, respectively.

The PLLs typically have matched input paths coupled to a phase detector. For example, PLL 420 includes matched input paths 422 and 424.

The matched input paths ensure that any propagation delays contributed by the input paths are identical. Phase detector 426 provides an output signal in accordance with the phase relationship of the input signals.

In order to allow for synchronization of signals of different frequencies, programmable divider\counter 450 gates one of the inputs to phase detector 426. In the illustrated embodiment, the reference clock signal to one input of the phase detector is gated with the divided clock signal from programmable divider\counter 450.

In particular, the reference clock input signal is gated with the output of programmable divider\counter 450 using AND gate 429 in input path 424. The gated signal is then provided to phase detector 426. In order to ensure that the PLL input paths 422 and 424 remain propagation delay matched, input path 422 includes AND gate 428. AND gates 428 and 429 are designed to have substantially the same propagation delay. Programmable divider\counter 460 is similarly coupled to PLL 430.

Integrated circuit 400 is designed so that programmable divider\counters 450 and 460 can be programmed via pins of the integrated circuit. If a programmable divider\counter is programmed to effectively divide by 1, its associated PLL will maintain synchronicity between the propagated clock signal and the reference clock signal 370 at the same frequency. If a programmable divider\counter is programmed to effectively divide the reference clock signal by a value other than one, its associated PLL will maintain the propagated clock signal in synchronization with the reference clock signal 470 even though the two are at different frequencies.

Figure 5:
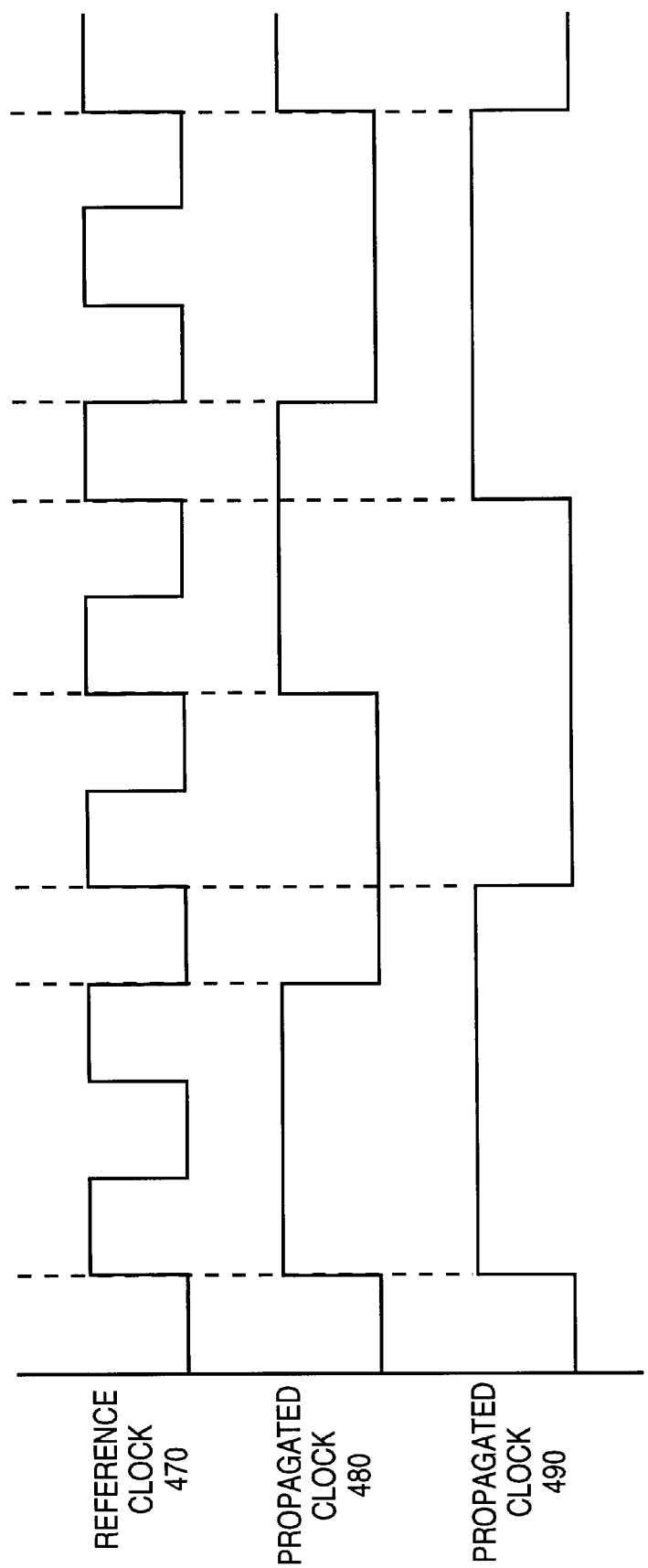
FIG. 5 illustrates a reference clock signal in synchronization with clock signals of various frequencies.

FIG. 5 illustrates the reference clock signal, and the propagated clock signals at points 480 and 490 of FIG. 4 for PLLs 410, 420, and 430 when programmable divider\counter 450 has been programmed with a 3 and programmable divider\counter 460 is programmed with a 4.

With respect to propagated clock signal 480, the rising edge of propagated clock signal 480 is aligned with a rising edge of reference clock signal 470. Thus propagated clock signal 480 is in phase and synchronous with respect to reference clock signal 470.

Similarly, the rising edge of propagated clock signal 490 is aligned with a rising edge of reference clock signal 470. Thus propagated clock signal 490 is in phase and synchronous with respect to reference clock signal 470.

The use of multiple PLLs and multiple programmable dividers (or counters) allows the flexibility to maintain a plurality of propagated clock signals in synchronization with reference clock signal 470. Moreover, the synchronization is maintained even if the propagated clock signals are different in frequency from each other as well as the reference clock signal, as long as the propagated clock signal is a function 1/n of the reference clock signal 470 (where n is an integer $\geq 1$).

Propagated clock signals 480 and 490 will be synchronized with respect to each other if programmable divider/counters 450 and 460 are programmed with the same values. Let C1 and C2 represent the values stored in programmable divider/counters 450 and 460 respectively. Propagated clock signals 480 and 490 will be synchronized with respect to each other as long as C1 and C2 are selected so that $$\max(C1, C2) \bmod \min(C1, C2)=0$$

The function x mod y returns the remainder of x/y. The function min(x, y) returns the minimum of values x and y. The function max(x, y) returns the maximum of values x and y.

Figure 6:
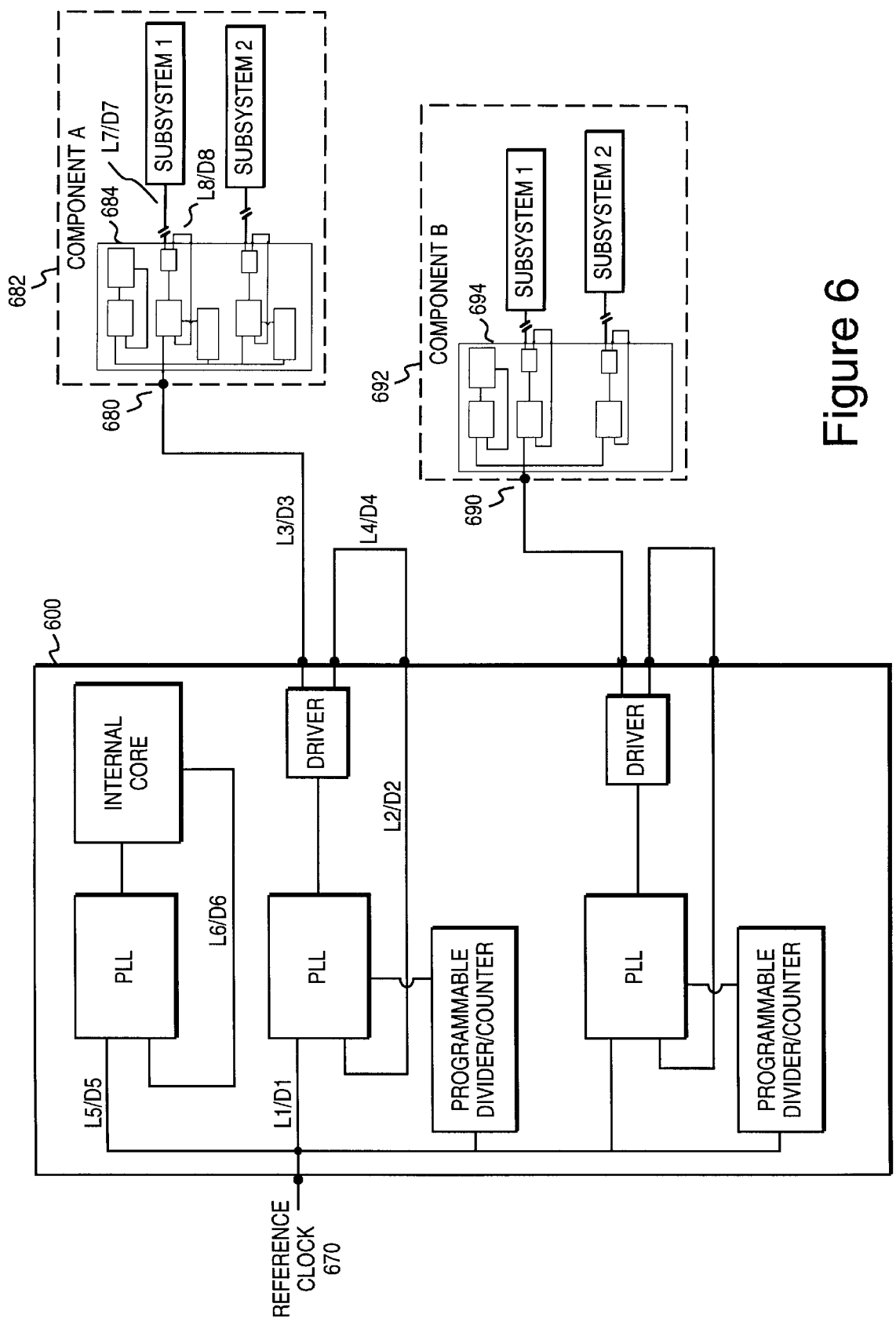
FIG. 6 illustrates cascaded multiple PLL circuits.

FIG. 6 illustrates a system in which the integrated circuit having multiple PLLs is cascaded with other multiple PLL circuits. This permits synchronizing cascaded components with each other. Thus referring to FIG. 4, component A may include a multiple PLL circuit such as integrated circuit 400 in order to synchronize its subsystems with the signal provided to its reference clock signal input pin. In such a case integrated circuit 400 and component A are coupled such that the multiple PLL integrated circuits are cascaded. With respect to FIG. 6, the multiple PLL circuit 684 of component A 682 is cascaded with respect to multiple PLL integrated circuit 600. Similarly, the multiple PLL circuit 694 of component B 692 is cascaded with respect to multiple PLL integrated circuit 600. When the feedback paths are selected as described above, the clock signals propagated to the reference clock signal pins 680 and 690 will be synchronous with respect to the reference clock signal at reference clock signal pin 670.

Electrical lengths L1, L2, L5, and L6 are selected such that L1≈L2 and L5≈L6. In one embodiment this results in physical path lengths D1, D2, D5, and D6 such that D1≈D2 and D5≈D6. In one embodiment, L1≈L5 such that L1≈L2≈L5≈L6. In one implementation this corresponds to substantially equal physical lengths such that D1≈D2≈D5≈D6.

In one embodiment, electrical length L4 is selected such that L3≈L4. In one implementation the corresponding physical path lengths are substantially the same such that D3≈D4.

The propagation paths and feedback paths of the cascaded integrated circuits are selected such that L7≈L8. In one embodiment, this corresponds to physical path lengths D7 and D8 such that D7≈D8. The feedback paths and propagation paths need not be the same across the different tiers. Thus L7 and L8 may be selected independently of L3 and L4 such that L7 and L8 are substantially not equivalent to L3 and L4, respectively.

As illustrated in FIG. 6, the cascaded PLLs may be any mix of the multiple PLL circuit design with or without the programmable divider/counter. Thus, for example, component A 682 includes the multiple PLL circuit 684 with programmable divider/counters as illustrated in FIG. 4 (400). Component B 692 includes the multiple PLL circuit 694 without the programmable divider/counters as illustrated in FIG. 3 (300).

The cascaded multiple PLL circuits form a "chain" where each link is a multiple PLL circuit. When PLLs are cascaded or chained together, each subsequent link (determined with respect to direction of propagation of the clock signal) must have enough bandwidth to track the changes in any preceding PLL or link in the chain. As long as the operational frequency is well within the bandwidth of a given PLLs, the cascaded PLL may generally have any bandwidth greater than or equal to that of the given PLL Thus each PLL in the chain of PLLs could have substantially the same bandwidth. Alternatively, the PLLs may have varying bandwidths.

Figure 7:
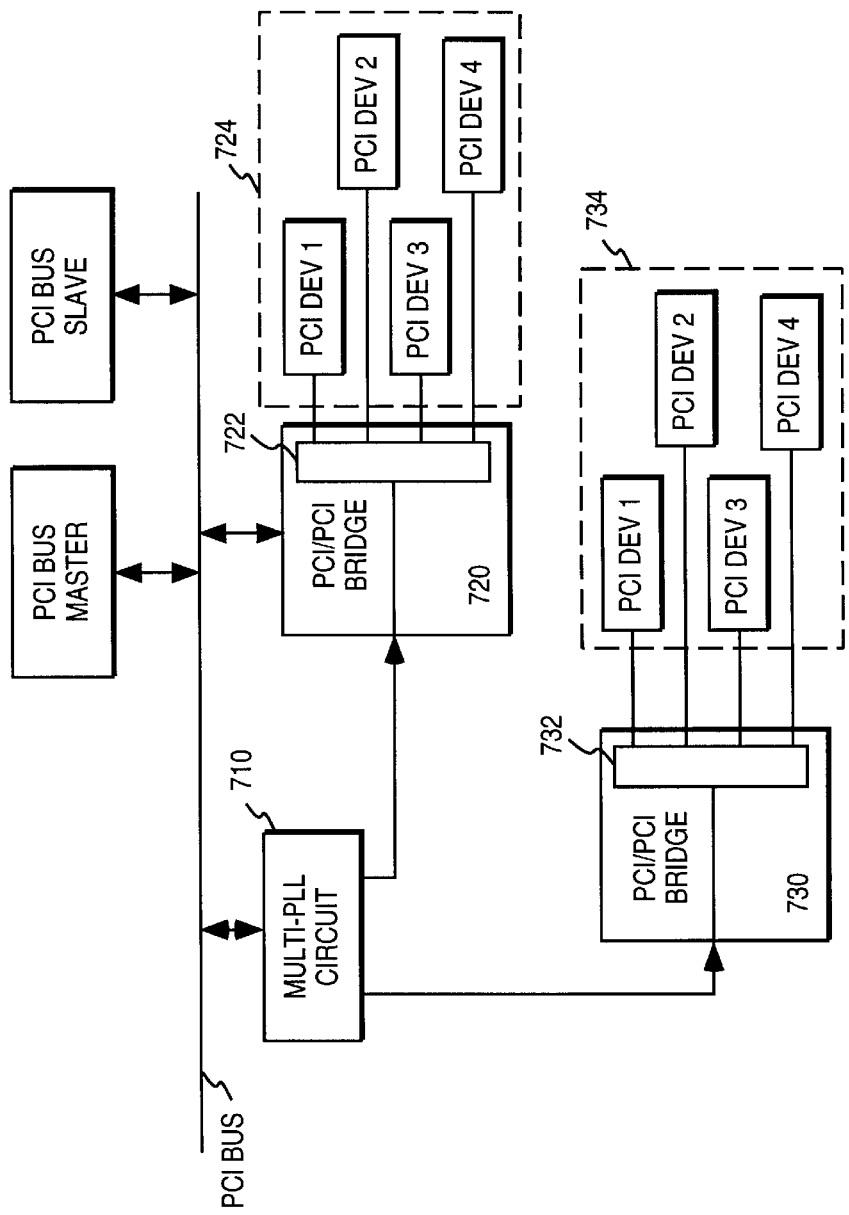
FIG. 7 illustrates the use of cascaded multiple PLL circuits to synchronize components and tiers at different hierarchies of a computer system.

The multiple PLL circuit may be incorporated into various components to enable synchronizing components within each hierarchy of the system to a common clock signal. FIG. 7 illustrates implementing the multiple PLL circuit in the computer architecture of FIG. 1 in order to synchronize the PCI bridges and their components with respect to the common clock signal and each other. A multiple PLL circuit 710 provides a clock signal to PCI bridges 720 and 730. The feedback loops for each PLL are not illustrated, however, they are selected as previously discussed. Each PCI bridge may include a multiple PLL circuit (722, 732) to synchronize the next tier of components (724, 732).

Thus the integrated circuit having multiple internal phase locked loops permits synchronization of hierarchically distinct chipset components and subsystems within a computer system within certain constraints. Moreover, the integrated circuit is designed so that the system integrator is free to place the components or subsystems as needed as long as the propagation traces and feedback traces are maintained as described above. The programmable dividers\counters permit the same input\output chipset to be used with computer systems having processors of different operating speeds. The multiple PLL circuit can be used at different tiers of the computer system hierarchy to ensure relative synchronicity between the various components at a particular tier of the computer system architecture. Similarly, the multiple PLL circuit can be cascaded to provide synchronization between tiers of the computer system.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:

a first integrated circuit and a second integrated circuit each comprising:

a first phase-locked loop (PLL) formed on an integrated circuit die;

a reference clock signal pin coupled to the first PLL by a first path of electrical length L1;

a first PLL driver coupled to the first PLL; and a first PLL feedback pin coupled to the first PLL by a second path of electrical length L2, wherein L1≈L2;

wherein the first PLL driver of the first integrated circuit is coupled to the reference clock signal pin of the second integrated circuit by a first propagation path of electrical length L3.

2. The apparatus of claim 1 wherein the first path has a physical length D1, wherein the second path has a physical length D2, wherein D1≈D2.

3. The apparatus of claim 1 wherein the first PLL driver of the first integrated circuit is coupled by a first feedback path of electrical length L4 to the first PLL feedback pin of the first integrated circuit, wherein L3–L4.

4. The apparatus of claim 3 wherein the propagation path has a physical length D3, wherein the first feedback path has a physical length D4, wherein D3–D4.

5. The apparatus of claim 1 wherein each integrated circuit further comprises:

an internal core formed on the integrated circuit die; and a second PLL formed on the integrated circuit die, the second PLL coupled to the reference clock signal pin by a core propagation path of electrical length L5, the second PLL coupled to the internal core by a core feedback path of electrical length L6, wherein L5≈L6.

6. The apparatus of claim 5 wherein L1≈L5.

7. The apparatus of claim 6 wherein L1, L2, L5 and L6 correspond to respective physical lengths D1, D2, D5, and D6, wherein D1≈D2≈D5≈D6.

8. The apparatus of claim 5, wherein the first path has a physical length D1, wherein the second path has a physical length D2, propagation path has a physical length D5, wherein the core feedback path has a physical length D6, wherein D1≈D2, wherein D5≈D6.

9. The apparatus of claim 1, wherein a propagated signal at one end of the first propagation path has a same frequency as a reference clock signal applied to the reference clock signal pin of the first integrated circuit.

10. The apparatus of claim 1 further comprising:

a component coupled to the first PLL driver of the second integrated circuit by a propagation path of electrical length L7, wherein the propagation path provides a cascaded propagated signal to the component, wherein the cascaded propagated signal is synchronous to a reference clock signal provided to the reference clock signal pin of the first integrated circuit.

11. The apparatus of claim 10 wherein the propagated signal has a same frequency as the reference clock signal.

12. The apparatus of claim 10 wherein the feedback pin of the second integrated circuit is coupled to the first PLL driver of the second integrated circuit by a second feedback path of electrical length L8.

13. The apparatus of claim 12 wherein L7≈L8.

14. The apparatus of claim 12 wherein L7 and L8 have corresponding physical lengths of D7 and D8, wherein D7≈D8.

* * * * *

UNITED STATES PATENT AND TRADEMARK OFFICE
CERTIFICATE OF CORRECTION

PATENT NO. : 6,112,308
DATED : August 29, 2000
INVENTOR(S) : Self et al.

It is certified that error appears in the above-identified patent and that said Letters Patent is hereby corrected as shown below:

Column 4,
Table 1, line 26, delete "PPL", insert -- PLL --.
Table 1, line 37, delete "PPL", insert -- PLL --.

Signed and Sealed this

Fourth Day of June, 2002

Attest:

Attesting Officer

JAMES E. ROGAN
Director of the United States Patent and Trademark Office